United States Patent
Ajmera et al.

(10) Patent No.: US 9,276,893 B2
(45) Date of Patent: Mar. 1, 2016

(54) DETERMINING STATES OF A THREADED COMMUNICATION

(71) Applicant: International Business Machines Corporation, Armonk, NY (US)

(72) Inventors: Jitendra Ajmera, Bangalore (IN); Ashish Verma, Bangalore (IN); Katyaini H. Naga, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/741,625

(22) Filed: Jan. 15, 2013

(65) Prior Publication Data

US 2014/0201290 A1   Jul. 17, 2014

(51) Int. Cl.
*G06F 13/00* (2006.01)
*H04L 12/58* (2006.01)

(52) U.S. Cl.
CPC .............. *H04L 51/32* (2013.01); *H04L 51/16* (2013.01)

(58) Field of Classification Search
CPC ............ H04L 29/12066; H04L 29/1511; H04L 1/5064; H04L 51/16; H04L 3/15175; H04L 12/585; H04L 12/58; H04L 12/581; H04L 12/5855; H04L 51/32; G06N 99/005; G06N 7/005; G06K 9/6297; G06K 9/00879; G06K 9/6232; G06K 9/6296; G06K 9/6277; H04M 3/523; H04M 3/5191; G06Q 10/107
USPC ........... 709/224, 226, 228, 206; 707/709, 732
See application file for complete search history.

(56) References Cited

U.S. PATENT DOCUMENTS

| | | | |
|---|---|---|---|
| 4,817,156 A * | 3/1989 | Bahl et al. | 704/256.2 |
| 8,032,481 B2 | 10/2011 | Pinckney et al. | |
| 2001/0011360 A1 * | 8/2001 | Shigeta | 714/724 |
| 2002/0099594 A1 * | 7/2002 | Heard | 705/10 |
| 2009/0199103 A1 | 8/2009 | Brantley et al. | |
| 2010/0191856 A1 * | 7/2010 | Gupta et al. | 709/228 |
| 2010/0293560 A1 * | 11/2010 | Bland et al. | 719/328 |
| 2011/0252022 A1 * | 10/2011 | Panchadsaram et al. | 707/723 |
| 2012/0158720 A1 * | 6/2012 | Luan et al. | 707/732 |

(Continued)

OTHER PUBLICATIONS

Qu et al., Finding Problem Solving Threads in Online Forums, IJCNLP, 1413-1417, Nov. 2011.

(Continued)

*Primary Examiner* — Robert B Harrell
(74) *Attorney, Agent, or Firm* — Ryan, Mason & Lewis, LLP

(57) ABSTRACT

Techniques, systems, and articles of manufacture for determining the current logical state of a social media communication thread. A method includes computing an initial probability for applicability of each of multiple logical states for a first entry in a social media communication thread, wherein each logical state corresponds to a stage of interaction between customers of an enterprise and/or agents of the enterprise based on features derived from content of entries in the communication thread, network structure of entries, and identity of authors of entries, computing a transition probability between each subsequent consecutive entry in the communication thread, wherein the transition probability indicates the probability of moving from one logical state to another, and determining the current logical state of the communication thread based on the computed initial probability for the first entry and the computed transition probability between each subsequent entry in the communication thread.

20 Claims, 6 Drawing Sheets

(56) References Cited

U.S. PATENT DOCUMENTS

| | | |
|---|---|---|
| 2012/0173633 A1* | 7/2012 | Balabhadrapatruni et al. ............ 709/206 |
| 2012/0185544 A1 | 7/2012 | Chang et al. |
| 2012/0221638 A1 | 8/2012 | Edamadaka et al. |
| 2013/0013535 A1* | 1/2013 | Punera et al. ............ 706/12 |
| 2013/0173333 A1* | 7/2013 | Zhang et al. ............ 705/7.29 |
| 2013/0218865 A1* | 8/2013 | Angulo et al. ............ 707/709 |
| 2013/0262168 A1* | 10/2013 | Makanawala et al. ....... 705/7.14 |
| 2014/0082573 A1* | 3/2014 | Nakahara ............ 716/108 |

OTHER PUBLICATIONS

Ding et al., Using Conditional Random Fields to Extract Contexts and Answers of Questions from Online Forums, ACL-2008, HLT, 710-718.

Cong et al., Finding Question-Answer Pairs from Online Forums, SIGIR 2008.

* cited by examiner

DETERMINING STATES OF A THREADED COMMUNICATION

FIELD OF THE INVENTION

Embodiments of the invention generally relate to information technology, and, more particularly, to customer relationship management over social media channels.

BACKGROUND

As social customer relationship management (CRM) becomes more prevalent, tools, techniques and protocols will be required to manage the threaded and collaborative communications conducted on social media forums. Threaded and public communication on such forums can, for example, result in fellow community members solving problems, and reducing the burden on corporate social responsibility (CSR). However, a negative reaction on such a forum, if not addressed in a timely manner and/or with proper care, can lead to a chain of negative reactions. Accordingly, given the potential for considerable amounts of noise on such forums, a need exists for providing efficient solutions to prioritize, open, close and reopen cases identified on social media forums that pertain to customer relations.

SUMMARY

In one aspect of the present invention, techniques for determining the current logical state of a social media communication thread are provided. An exemplary computer-implemented method for determining one or more logical states of a communication thread includes steps of computing an initial probability for applicability of each of multiple logical states for a first entry in a social media communication thread, wherein each logical state corresponds to a stage of interaction between one or more customers of an enterprise and/or one or more agents of the enterprise based on one or more features derived from content of one or more entries in the communication thread, network structure of one or more entries in the communication thread, and identity of one or more authors of one or more entries in the communication thread. The method also includes computing a transition probability between each subsequent consecutive entry in the communication thread, wherein the transition probability indicates the probability of moving from one logical state to another logical state, and determining the current logical state of the communication thread based on the computed initial probability for the first entry and the computed transition probability between each subsequent entry in the communication thread from the first entry to a current entry.

In another aspect of the invention, an exemplary computer-implemented method for automatically determining a current logical state of a threaded communication can include steps of computing an initial probability for applicability of each of multiple logical states for a first entry in a social media communication thread, wherein each logical state corresponds to a stage of interaction between one or more customers of an enterprise and/or one or more agents of the enterprise based on one or more features derived from content of one or more entries in the communication thread, network structure of one or more entries in the communication thread, and identity of one or more authors of one or more entries in the communication thread. The method can also include computing a transition probability between each subsequent consecutive entry in the communication thread, wherein the transition probability indicates the probability of moving from one logical state to another logical state, automatically determining the current logical state of the communication thread based on the computed initial probability for the first entry and the computed transition probability between each subsequent entry in the communication thread from the first entry to a current entry, and executing an action in connection with the threaded communication based on the determined current logical state of the threaded communication.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These elements, as well as other objects, features and advantages of the present invention will become apparent from the following detailed description of illustrative embodiments thereof, which is to be read in connection with the accompanying set of drawings.

DETAILED DESCRIPTION

As described herein, an aspect of the present invention includes techniques for inferring a current logical state of a threaded communication. As detailed herein, a threaded communication implies a multi-party communication initiated by a community member and subsequently responded to or commented on by fellow community members. The subsequent responses (also referred to herein as entries) themselves may appear in response to either the first entry or any of the entries made up to that point in the communication thread. A logical state is characterized by the logical action intended when that state is reached. In an example context, these states can be defined on the basis of what logical actions an enterprise would like to take for the threaded communications in question.

At least one embodiment of the invention includes leveraging content features and threaded structure of a communication, and integrating human knowledge with a machine learning algorithm to provide an automated mechanism to determine and/or infer the logical current state of a threaded communication. By way of illustration, in an example embodiment of the invention, logical states can include "Respond," "Do Not Respond," "Closed," and "Awaiting More Information."

Additionally, at least one embodiment of the invention includes utilizing sequence analysis algorithms such as Hidden Markov Models (HMMs), Conditional Random Fields (CRFs), etc. As also detailed further herein, at least one embodiment of the invention includes training and runtime phases. During a training phase, data can be labeled in terms of threads and states, and used for inferring parameters of the model. During a runtime phase, the trained model can be used for determining and/or identifying the most likely logical state sequence of a particular communication.

Accordingly, aspects of the invention include leveraging the sequential and collaborative nature of threaded communications, as well as fusing human knowledge with machine learning techniques to automatically to derive a current logical state of a communication thread.

Figure 1:
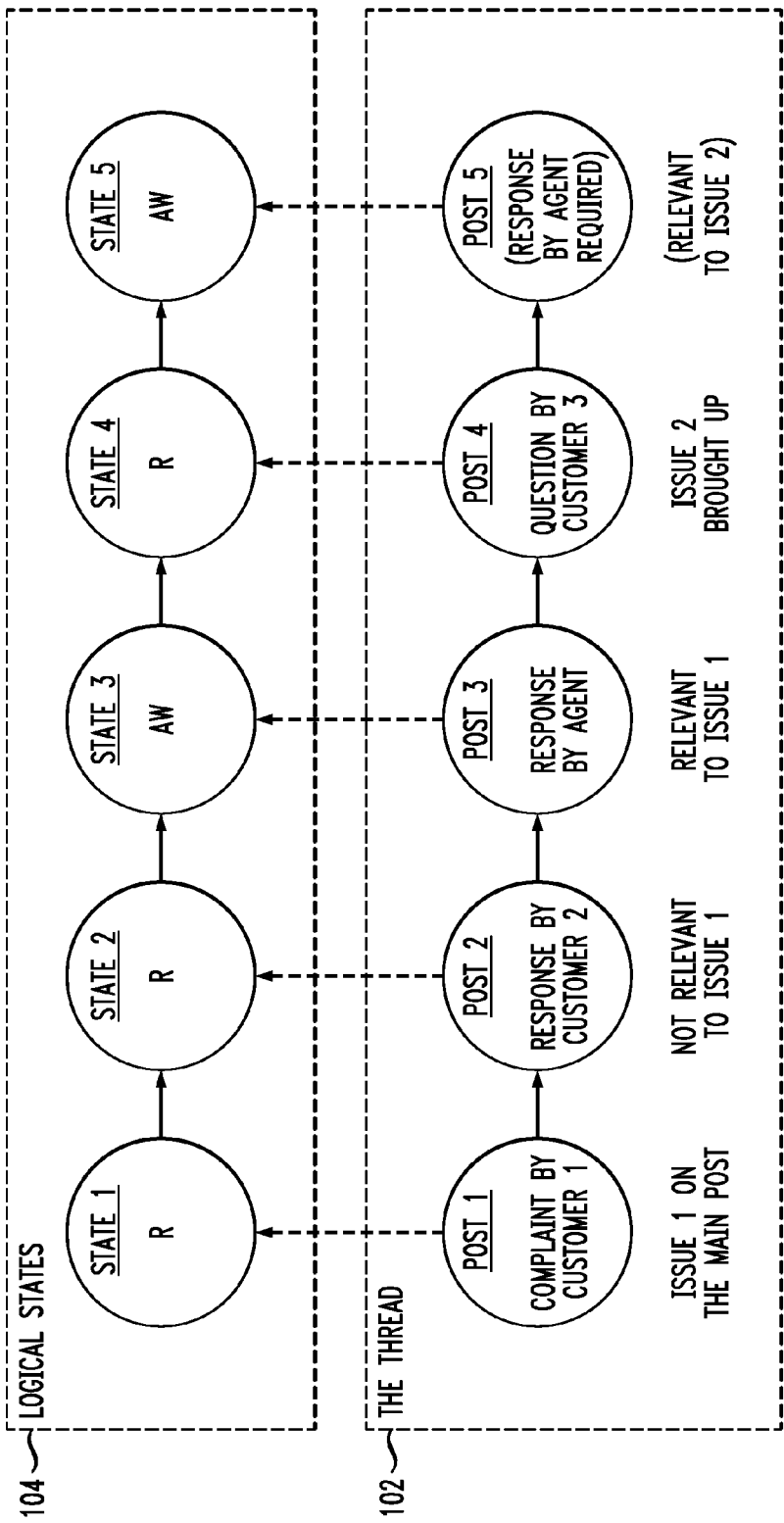
FIG. 1 is a diagram illustrating an example threaded communication and possible logical states, according to an embodiment of the invention.

FIG. 1 is a diagram illustrating an example threaded communication and possible logical states, according to an embodiment of the invention. Specifically, FIG. 1 depicts a communication thread 102 (for example, from a social media forum) and a set of logical states 104. As noted above and further used herein, logical states can include respond (R), awaiting more information (AW), closed (C), and do not respond (DR).

In thread 102, Post 1 includes a complaint by Customer 1, which is related and/or relevant to Issue 1 on the main post. As used subsequently herein, the first entry in a communication thread can also be referred to as the main post or the root post. The corresponding logical state in connection with Post 1 is State 1, which is a "Respond" state. This indicates that, at this point in the communication thread, when only the first entry is observed, the action most suited for an enterprise to take would be to "respond," and that is why the threaded communication is noted as in the "respond" state. After observing a few more exchanges or entries, if it turns out that the issue raised in the main post has been resolved, the action an enterprise should take at that point is to "wait for more information," and, accordingly, the threaded communication would be marked as in the "awaiting more information" state. Further, if a positive satisfactory response appears from the author of the main post, the threaded communication can be marked as in a "closed" state, indicating that there are no remaining tasks to be carried out at that point.

Additionally, in thread 102, Post 2 includes a response by Customer 2, which is not relevant to Issue 1. The corresponding logical state in connection with Post 2 is State 2, which is a "Respond" state. Post 3 in thread 102 includes a response by an Agent, which is relevant to Issue 1. The corresponding logical state in connection with Post 3 is State 3, which is an "Awaiting More Information" state. As noted herein, a state is said to be in the "awaiting more information" state when the person who initiated the complaint has not yet acknowledged a full closure of the problem. It is also possible, for example, that the enterprise agent, in his or her response, has asked for more information (such as the date of a purchase) and is waiting for the customer, who is also the author of the main post, to provide that information.

Post 4 includes a question by Customer 3, wherein the question brings up Issue 2 in the communication. The corresponding logical state in connection with Post 4 is State 4, which is a "Respond" state. Post 5 includes a required response by the Agent, wherein the response is relevant to Issue 2. The corresponding logical state in connection with Post 5 is State 5, which is an "Awaiting More Information" state. The agent is now waiting for information from either customer 1 or customer 3, depending on the exact nature of the communication.

Figure 2:
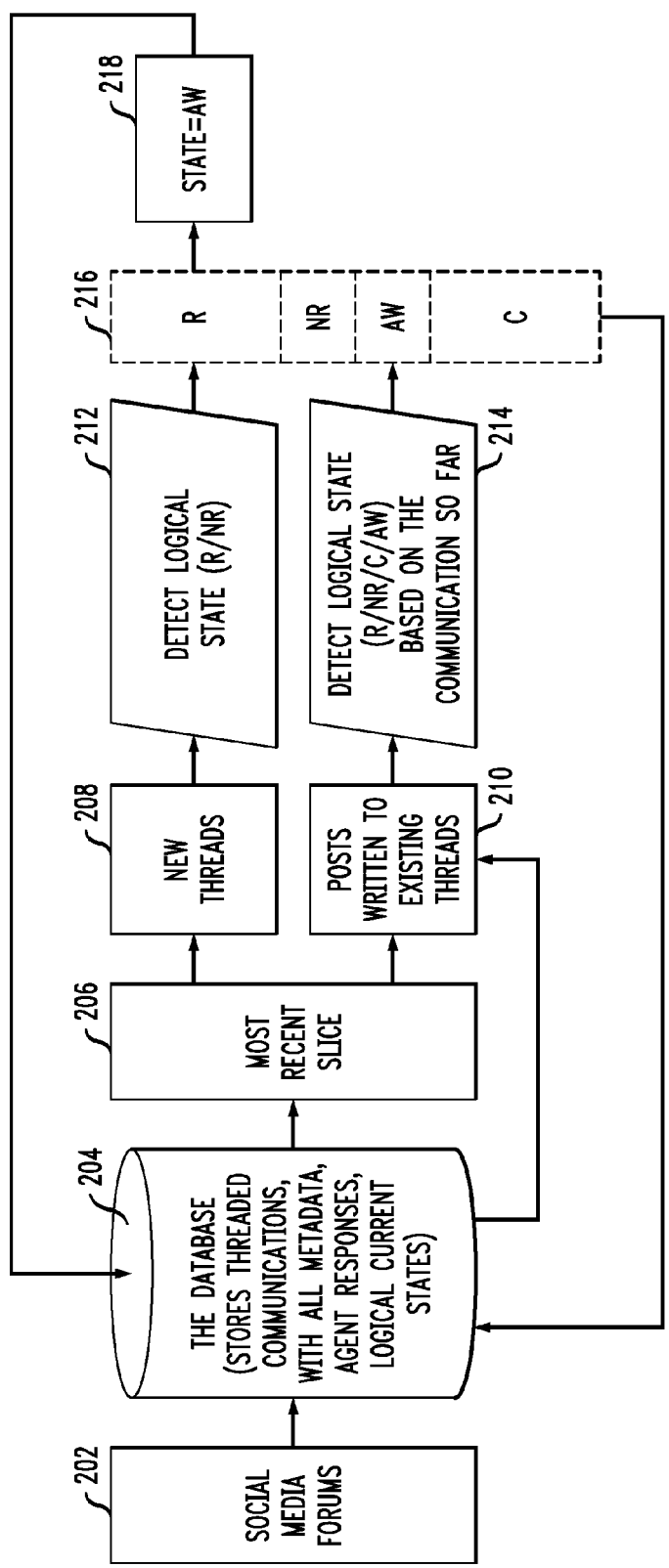
FIG. 2 is a block diagram illustrating an example embodiment, according to an aspect of the invention.

FIG. 2 is a block diagram illustrating an example embodiment, according to an aspect of the invention. By way of illustration, FIG. 2 depicts one or more social media forums 202, which provide input to a database 204. The database stores threaded communications, related metadata, agent responses, relevant logical current states, etc. FIG. 2 also depicts a most recent portion (or slice) 206 provided by the database 204. The most recent "slice" includes all of the entries made during a predefined duration of time (for example, one hour), ending at the current time instant. The most recent portion or slice 206 can be parsed into new threads 208 and posts 210 written to existing threads. Posts written to existing threads refer to those entries which were made in response to one of the entries made prior to the most recent slice.

In the new threads 208, there are only two logical states 212 possible, "Respond" and "Do Not Respond," given that there is no further dialogue with the customer. Note that the "Awaiting more information" and the "Closed" states are only possible after a dialogue between the author of the main post and either the community or the enterprise. In the posts 210 written to existing threads, a logical state is detected 214 from the set of logical states 216 ("Respond," "Do Not Respond," "Closed," or "Awaiting More Information"). In the example depicted in FIG. 2, the state of "Awaiting More Information" 218 is ultimately identified. This most current logical state 218 is stored in the database 204 to be used for future analysis, that is, analysis of slices later in time.

Figure 3:
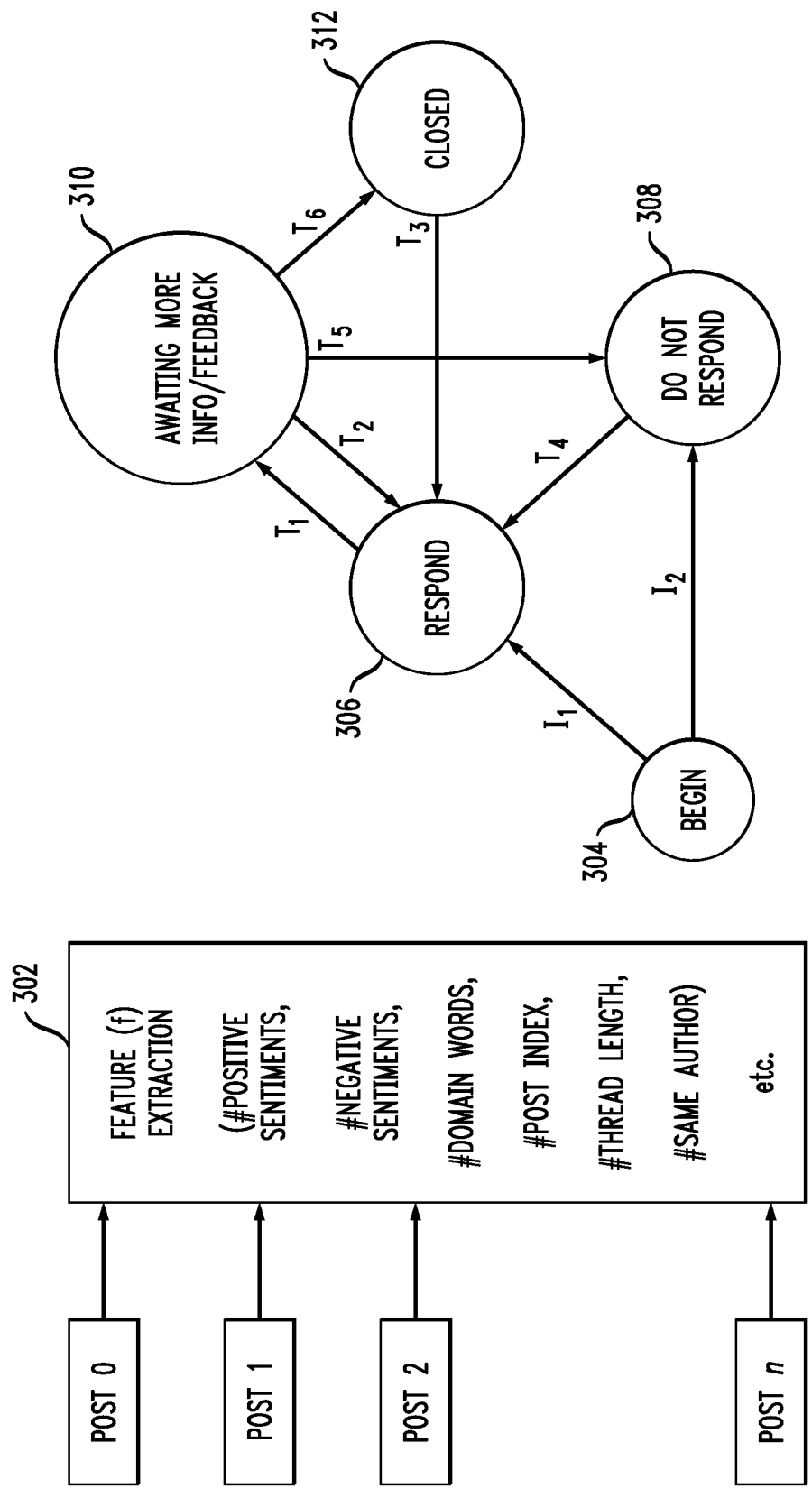
FIG. 3 is a diagram illustrating an example training technique, according to an embodiment of the invention.

FIG. 3 is a diagram illustrating an example training technique, according to an embodiment of the invention. By way of illustration, FIG. 3 depicts Post 0, Post 1, Post 2 and Post n, which are provided as input into a feature (f) extraction component 302. The feature extraction component 302 identifies elements in the communication content such as, for example, positive sentiments, negative sentiments, domain words, a post index, thread length, identification of a same author, etc. An example logical state training sequence, such as depicted in FIG. 3, can include a beginning point 304, a "Respond" state 306, a "Do Not Respond" state 308, an "Awaiting More Information" state 310, and a "Closed" state 312.

More specifically, in the example depicted in FIG. 3, during training, at least one embodiment of the invention includes learning initial probabilities, $I_1$ and $I_2$, wherein $I_1$ is the initial probability that a "Respond" state is applicable based on the relevant portion(s) of the communication thread, and $I_2$ is the initial probability that a "Do Not Respond" state is applicable based on the relevant portion(s) of the communication thread. These probabilities can be computed, for example, based on how many times in the training data a threaded communication starts with a "Respond" or "Do Not Respond" state.

Additionally, at least one embodiment of the invention includes learning the transition probabilities, for example, $T_1$ through $T_6$. A transition probability is defined between two states and indicates the probability of moving from one state to another. In the case of HMMs, for example, training algorithms such as Baum-Welch can be used for this purpose. However, it is to be appreciated that embodiments of the present invention are not limited to only HMM algorithmic possibilities. Subsequently, probability distributions, P(feature|state), can be calculated using labeled data (post, state). By way of example, in the case of HMMs, the Baum-Welch algorithm can be used. However, it is to be appreciated that any other sequence modeling approach can be used for this purpose. In the case of HMM, for example, all of the features corresponding to one state are analyzed together to compute the distribution P(feature|State).

Further, during runtime, at least one embodiment of the invention includes computing likelihoods P(feature|state) of current logical states. In contrast to the training phase, wherein P(feature|State) is determined—that is, the parameters required to estimate P(feature|State) were estimated—in the runtime phase, P(feature|State) is actually used to compute a probability value.

Also, at least one embodiment of the invention includes determining and/or identifying the most likely state sequence that maximizes the joint likelihood of the sequence as well as the extracted features. Accordingly, at least one embodiment of the invention includes exploiting information from i) the sequence of the communication to a current point, and ii) the content of each entry. Consider, for example, a scenario where it becomes clear that the second entry in a communication thread is an "Answer." Knowing that the second entry is an answer reinforces the belief that the first entry was a "Question," even though that might not have been apparent from the content of the first entry. The sequence of the communication is characterized by the transition probabilities, whereas the content of the entries is characterized by the features and the probability distributions P(feature|state). An algorithm such as, for example, the Viterbi decoding algorithm can efficiently determine the optimal state sequence, exploiting the two above-noted factors. It is to be appreciated that any other sequence model (for example, CRF) can be also used for this purpose.

Figure 4:
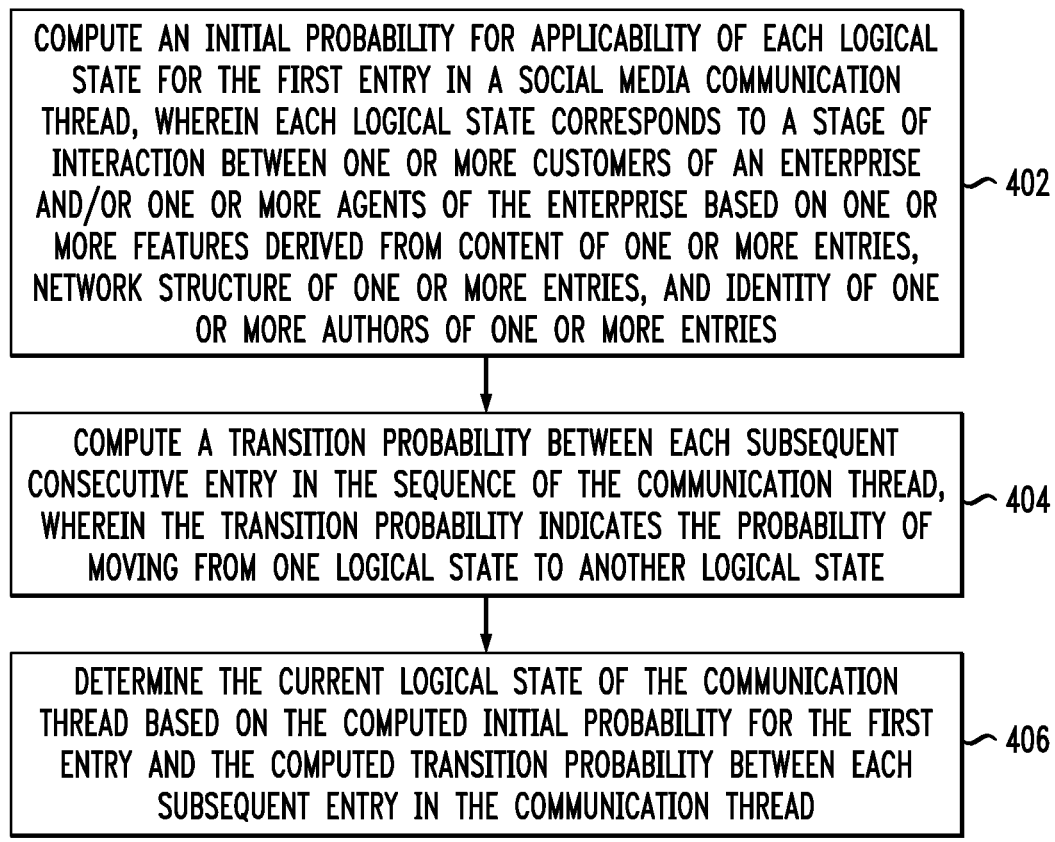
FIG. 4 is a flow diagram illustrating techniques for determining the current logical state of a social media communication thread, according to an embodiment of the invention.

FIG. 4 is a flow diagram illustrating techniques for determining the current logical state of a social media communication thread, according to an embodiment of the present invention. Step 402 includes computing an initial probability for applicability of each of multiple logical states for a first entry in a social media communication thread, wherein each logical state corresponds to a stage of interaction between one or more customers of an enterprise and/or one or more agents of the enterprise based on one or more features derived from content of one or more entries in the communication thread, network structure of one or more entries in the communication thread, and identity of one or more authors of one or more entries in the communication thread. Computing an initial probability can include computing the initial probability of each logical state for the first entry based on the number of times in a set of training data that a communication thread starts with a first state (for example, a "Respond" state) or a second state (for example, a "Do Not Respond" state).

Step 404 includes computing a transition probability between each subsequent consecutive entry in the communication thread, wherein the transition probability indicates the probability of moving from one logical state to another logical state. Computing a transition probability can include incorporating human knowledge in terms of one or more allowable transitions.

Step 406 includes determining the current logical state of the communication thread based on the computed initial probability for the first entry and the computed transition probability between each subsequent entry in the communication thread from the first entry to a current entry. The techniques depicted in FIG. 4 can also include storing the communication thread (along with one or more items or relevant metadata) and the determined logical state for each entry in the communication thread in a database.

The techniques depicted in FIG. 4 can also include extracting at least one feature for each entry in a communication thread, wherein said extracting is based on the content of each entry. As described herein, a threaded communication can include a multi-party communication initiated by a first user or community member and subsequently responded to and/or commented on by one or more fellow users or community members.

Figure 5:
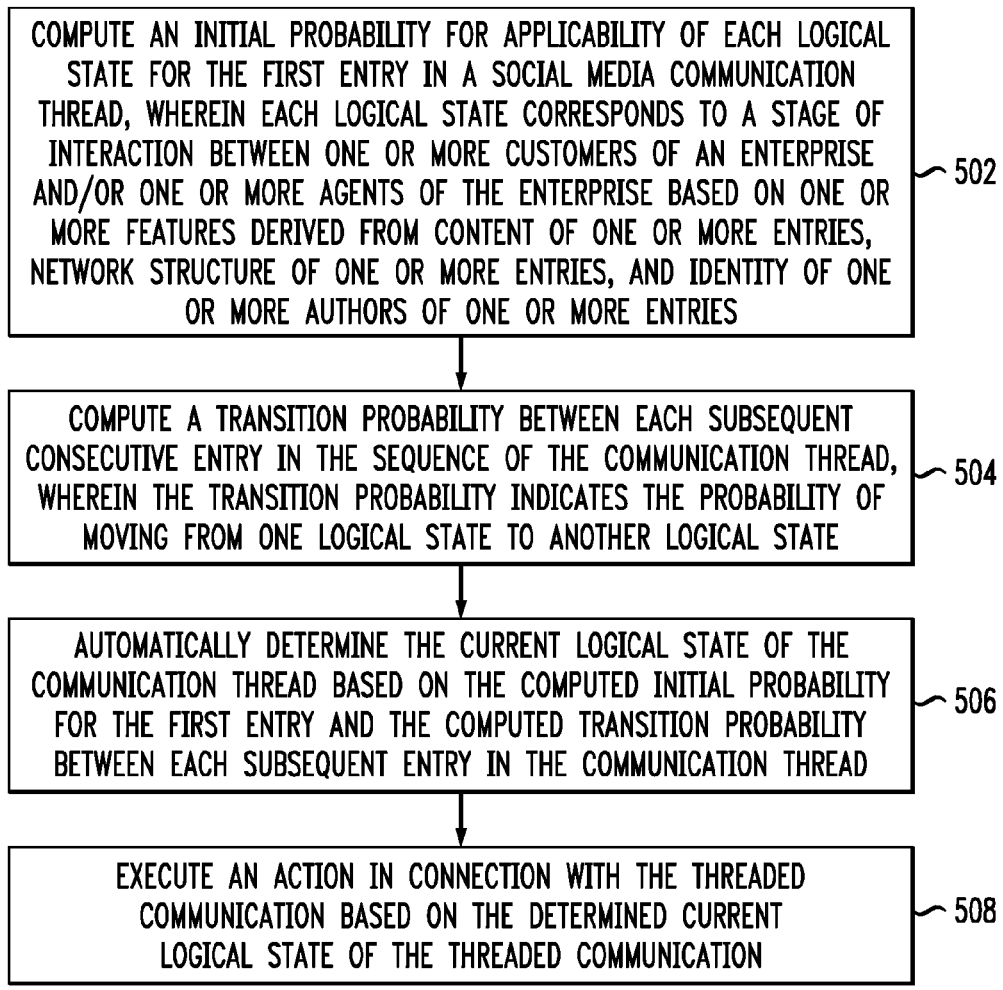
FIG. 5 is a flow diagram illustrating techniques for automatically determining the current logical state of a social media communication thread, according to an embodiment of the invention.

FIG. 5 is a flow diagram illustrating techniques for automatically determining the current logical state of a social media communication thread, according to an embodiment of the invention. Step 502 includes computing an initial probability for applicability of each of multiple logical states for a first entry in a social media communication thread, wherein each logical state corresponds to a stage of interaction between one or more customers of an enterprise and/or one or more agents of the enterprise based on one or more features derived from content of one or more entries in the communication thread, network structure of one or more entries in the communication thread, and identity of one or more authors of one or more entries in the communication thread.

Step 504 includes computing a transition probability between each subsequent consecutive entry in the communication thread, wherein the transition probability indicates the probability of moving from one logical state to another logical state. Step 506 includes automatically determining the current logical state of the communication thread based on the computed initial probability for the first entry and the computed transition probability between each subsequent entry in the communication thread from the first entry to a current entry.

The techniques depicted in FIG. 5 also include extracting at least one feature for each entry in a communication thread, wherein said extracting is based on the content of each entry. Automatically determining a current logical state can include determining a logical state sequence among the entries in the communication thread with the highest likelihood based on the one or more features identified.

Step 508 includes executing an action in connection with the threaded communication based on the determined current logical state of the threaded communication. Executing an action can include, for example, automatically prioritizing an action item in a customer relationship management system based on the determined logical states, automatically reopening an action item in a customer relationship management system based on the determined logical states, and/or automatically closing an action item in a customer relationship management system based on the determined logical states.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
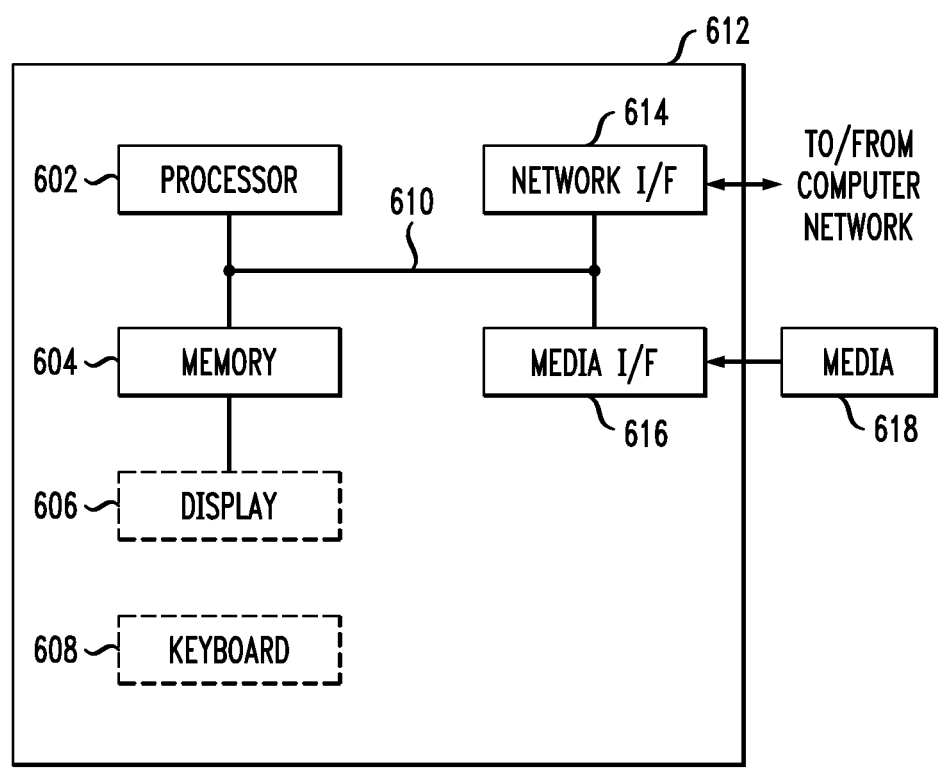
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, leveraging the sequential and collaborative nature of threaded communications to derive a current logical state of a thread.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining the current logical state of a social media communication thread, the method comprising:
    capturing multiple social media communication threads pertaining to an enterprise from one or more social media forums into an enterprise-specific database;
    computing an initial probability for applicability of each of multiple logical states for a first entry in a given social media communication thread between one or more customers of the enterprise and/or one or more agents of the enterprise extracted from the enterprise-specific database, wherein each of the multiple logical states is defined on a basis of an action to be taken by the enterprise at a given point in the communication thread, and wherein the initial probability is computed based on one or more features derived from (i) content of one or more entries in the communication thread, and (ii) identity of one or more authors of one or more entries in the communication thread, wherein said computing the initial probability is carried out by a machine learning module, executing on a hardware processor and communicatively linked to the enterprise-specific database, accessing the multiple social media communication threads in the enterprise-specific database;

computing a transition probability between each consecutive entry in the communication thread subsequent to the first entry, wherein the transition probability indicates the probability of moving from one logical state to another logical state, wherein said computing the transition probability is carried out by the machine learning module executing on the hardware processor and communicatively linked to the enterprise-specific database; and determining the current logical state of the communication thread based on the computed initial probability for the first entry and the computed transition probability between each subsequent entry in the communication thread from the first entry to a current entry, wherein said determining is carried out by the machine learning module executing on the hardware processor and communicatively linked to the enterprise-specific database.

2. The method of claim 1, wherein said computing an initial probability comprises computing the initial probability of each logical state for the first entry based on the number of times in a set of training data that a communication thread starts with a first state or a second state.

3. The method of claim 1, wherein said computing a transition probability comprises incorporating human knowledge in terms of one or more allowable transitions.

4. The method of claim 1, wherein a communication thread comprises a multi-party communication initiated by a first user and subsequently responded to and/or commented on by one or more fellow users.

5. The method of claim 1, further comprising:
storing the determined logical state for each entry in the communication thread in the enterprise-specific database.

6. An article of manufacture comprising a non-transitory computer readable storage medium having computer readable instructions tangibly embodied thereon which, when implemented, cause a computer to carry out a plurality of method steps comprising:
capturing multiple social media communication threads pertaining to an enterprise from one or more social media forums into an enterprise-specific database;
computing an initial probability for applicability of each of multiple logical states for a first entry in a given social media communication thread between one or more customers of the enterprise and/or one or more agents of the enterprise extracted from the enterprise-specific database, wherein each of the multiple logical states is defined on a basis of an action to be taken by the enterprise at a given point in the communication thread, and wherein the initial probability is computed based on one or more features derived from (i) content of one or more entries in the communication thread, and (ii) identity of one or more authors of one or more entries in the communication thread, wherein said computing the initial probability is carried out by a machine learning module, executing on a hardware processor and communicatively linked to the enterprise-specific database, accessing the multiple social media communication threads in the enterprise-specific database;

computing a transition probability between each consecutive entry in the communication thread subsequent to the first entry, wherein the transition probability indicates the probability of moving from one logical state to another logical state, wherein said computing the transition probability is carried out by the machine learning module executing on the hardware processor and communicatively linked to the enterprise-specific database; and determining the current logical state of the communication thread based on the computed initial probability for the first entry and the computed transition probability between each subsequent entry in the communication thread from the first entry to a current entry, wherein said determining is carried out by the machine learning module executing on the hardware processor and communicatively linked to the enterprise-specific database.

7. The article of manufacture of claim 6, wherein said computing an initial probability comprises computing the initial probability of each logical state for the first entry based on the number of times in a set of training data that a communication thread starts with a first state or a second state.

8. The article of manufacture of claim 6, wherein said computing a transition probability comprises incorporating human knowledge in terms of one or more allowable transitions.

9. The article of manufacture of claim 6, wherein a communication thread comprises a multi-party communication initiated by a first user and subsequently responded to and/or commented on by one or more fellow users.

10. The article of manufacture of claim 6, wherein the method steps comprise:
storing the determined logical state for each entry in the communication thread in the enterprise-specific database.

11. A system for determining the current logical state of a social media communication thread, comprising:
a memory; and
at least one processor coupled to the memory and operative for:
capturing multiple social media communication threads pertaining to an enterprise from one or more social media forums into an enterprise-specific database;
computing an initial probability for applicability of each of multiple logical states for a first entry in a given social media communication thread between one or more customers of the enterprise and/or one or more agents of the enterprise extracted from the enterprise-specific database, wherein each of the multiple logical states is defined on a basis of an action to be taken by the enterprise at a given point in the communication thread, and wherein the initial probability is computed based on one or more features derived from (i) content of one or more entries in the communication thread, and (ii) identity of one or more authors of one or more entries in the communication thread, wherein said computing the initial probability is carried out by a machine learning module executing on the at least one processor and communicatively linked to the enterprise-specific database, accessing the multiple social media communication threads in the enterprise-specific database;

computing a transition probability between each consecutive entry in the communication thread subsequent to the first entry, wherein the transition probability indicates the probability of moving from one logical state to another logical state, wherein said computing the transition probability is carried out by the machine learning module executing on the at least one processor and communicatively linked to the enterprise-specific database; and determining the current logical state of the communication thread based on the computed initial probability for the first entry and the computed transition probability between each subsequent entry in the communication thread from the first entry to a current entry, wherein said determining is carried out by the machine learning module executing on the at least one processor and communicatively linked to the enterprise-specific database.

12. The system of claim 11, wherein a communication thread comprises a multi-party communication initiated by a first user and subsequently responded to and/or commented on by one or more fellow users.

13. The system of claim 11, wherein the at least one processor is further operative for:

storing the determined logical state for each entry in the communication thread in the enterprise-specific database.

14. The system of claim 11, wherein said computing an initial probability comprises computing the initial probability of each logical state for the first entry based on the number of times in a set of training data that a communication thread starts with a first state or a second state.

15. A method for automatically determining the current logical state of a social media communication thread, the method comprising:

capturing multiple social media communication threads pertaining to an enterprise from one or more social media forums into an enterprise-specific database;

computing an initial probability for applicability of each of multiple logical states for a first entry in a given social media communication thread between one or more customers of the enterprise and/or one or more agents of the enterprise extracted from the enterprise-specific database, wherein each of the multiple logical states is defined on a basis of an action to be taken by the enterprise at a given point in the communication thread, and wherein the initial probability is computed based on one or more features derived from (i) content of one or more entries in the communication thread, and (ii) identity of one or more authors of one or more entries in the communication thread, wherein said computing the initial probability is carried out by a machine learning module, executing on a hardware processor and communicatively linked to the enterprise-specific database, accessing the multiple social media communication threads in the enterprise-specific database;

computing a transition probability between each consecutive entry in the communication thread subsequent to the first entry, wherein the transition probability indicates the probability of moving from one logical state to another logical state, wherein said computing the transition probability is carried out by the machine learning module executing on the hardware processor and communicatively linked to the enterprise-specific database;

automatically determining the current logical state of the communication thread based on the computed initial probability for the first entry and the computed transition probability between each subsequent entry in the communication thread from the first entry to a current entry, wherein said automatically determining is carried out by the machine learning module executing on the hardware processor and communicatively linked to the enterprise-specific database; and executing an action in connection with the threaded communication based on the determined current logical state of the threaded communication.

16. The method of claim 15, comprising:

extracting features for each entry in the communication thread, wherein said extracting is based on the content of each entry.

17. The method of claim 16, wherein said automatically determining a current logical state comprises determining a logical state sequence among the entries in the communication thread with the highest likelihood based on the one or more features extracted.

18. The method of claim 15, wherein said executing an action comprises automatically prioritizing an action item in a customer relationship management system based on the determined logical state.

19. The method of claim 15, wherein said executing an action comprises automatically reopening an action item in a customer relationship management system based on the determined logical state.

20. The method of claim 15, wherein said executing an action comprises automatically closing an action item in a customer relationship management system based on the determined logical state.

\* \* \* \* \*